(12) United States Patent
Paris

(10) Patent No.: US 9,149,751 B2
(45) Date of Patent: Oct. 6, 2015

(54) LIQUID KNOCKOUT DRUM

(75) Inventor: Daniel Paris, Sheffield (GB)

(73) Assignee: AES Engineering Ltd., Rotherham (GB)

( * ) Notice: Subject to any disclaimer, the term of this patent is extended or adjusted under 35 U.S.C. 154(b) by 445 days.

(21) Appl. No.: 13/599,542

(22) Filed: Aug. 30, 2012

(65) Prior Publication Data
US 2013/0047562 A1 Feb. 28, 2013

(30) Foreign Application Priority Data

Aug. 30, 2011 (GB) .................................. 1114871.5

(51) Int. Cl.
| | |
|---|---|
| *B01D 50/00* | (2006.01) |
| *B01D 45/06* | (2006.01) |
| *B01D 45/12* | (2006.01) |
| *B01D 53/26* | (2006.01) |
| *B01D 45/08* | (2006.01) |
| *F01M 13/04* | (2006.01) |

(52) U.S. Cl.
CPC ................ *B01D 45/06* (2013.01); *B01D 45/08* (2013.01); *B01D 45/12* (2013.01); *B01D 50/002* (2013.01); *B01D 53/26* (2013.01); *F01M 13/04* (2013.01); *F01M 2013/0433* (2013.01)

(58) Field of Classification Search
CPC ...... B01D 45/08; B01D 50/002; B01D 45/12; B01D 45/16; F01M 13/04
USPC ........... 55/319, 320, 325, 308, 426, 442–446, 55/462, 464, 465, 432, 433, DIG. 14; 95/267, 272
See application file for complete search history.

(56) References Cited

U.S. PATENT DOCUMENTS

| | | | | |
|---|---|---|---|---|
| 4,443,233 | A | * | 4/1984 | Moran ............................. 95/268 |
| 2005/0060970 | A1 | * | 3/2005 | Polderman ...................... 55/320 |

* cited by examiner

*Primary Examiner* — Dung H Bui
(74) *Attorney, Agent, or Firm* — Edwin D. Schindler

(57) ABSTRACT

A device for removing moisture from a gas includes an elongated vessel having a gas outlet at a first end, a moisture outlet at a second end and a gas inlet located between the gas outlet and the moisture outlet. The elongated vessel has a first gas flow modifier and a second gas flow modifier each for causing deviation of the flow of gas within the elongated vessel from a flow path extending directly between the gas inlet and the gas outlet. The first gas flow modifier is an angled baffle plate extending partly across the elongated vessel for directing the gas flow from the elongated vessel in a direction towards the moisture outlet. The second gas flow modifier has plates extending across the elongated vessel with each plate having elongated slots extending in the same orientation as the elongated slots of one plate extending in a direction rotated 90° from at least one other plate of the second gas flow modifier.

2 Claims, 3 Drawing Sheets

LIQUID KNOCKOUT DRUM

BACKGROUND OF THE INVENTION

1. Technical Field of the Invention

The present invention relates to a vertical liquid knockout drum which removes liquid particles from a gas stream.

2. Description of the Prior Art

There are many industrial applications for devices which serve to remove entrained liquid particles from a gas stream. One particular instance of this device is a gas inlet vessel for gas seals. At sealing pressure, some components of a gas stream can condense to form liquids, contaminating the seal carrier. Any liquid particles that accumulate on the face of the seal will affect the performance of the seal and possibly cause premature failure of the seal.

The common method for removing the liquid particles from a gas stream comprises a knockout vessel which is sized appropriately in relation to the velocity at which the gas stream is required to travel for moisture to be removed. In many such vessels, a mist eliminator is provided to enhance the efficiency of the vessel. The conventional arrangement is a mesh pad located immediately below the gas outlet. However, after time, the demister pad may become clogged and less effective.

SUMMARY OF THE INVENTION

According to the present invention there is provided, a device for removing moisture from a gas, the device comprising an elongated vessel having a gas outlet at one end, a moisture outlet at the other end and a gas inlet located between said gas outlet and said moisture outlet, said vessel including first and second gas flow modifying means for causing deviation of the flow of gas within the vessel from a flow path extending directly between said gas inlet and said gas outlet, said first gas flow modifying means being in the form of a plate extending partly across the vessel and arranged to direct the gas flow from the vessel in a direction towards said moisture outlet, said second gas flow modifying means being in the form of at least one plate extending across the vessel and having flow deflecting perforations therethrough.

Accordingly, the present invention provides a second stage of liquid removal designed to induce a small pressure change on the wet gas at certain points within the vessel and force the gas stream to move through a tortuous path, facilitating the siphoning off of liquid particles.

Preferably, the second gas flow modifying means comprises at least one plate having a plurality of elongate slots therein. More preferably, each slot has opposed elongate edges which are laterally displaced from each other. Each slot may be formed by pressing a section of material out of the plane of the plate to form a hooded orifice.

Preferably, the device includes a demister pad. More preferably, the demister pad comprises a mesh formed of monofilament wire.

Other objects and features of the present invention will become apparent when considered in combination with the accompanying drawing figures, which illustrate certain preferred embodiments of the present invention. It should, however, be noted that the accompanying drawing figures are intended to illustrate only select preferred embodiments of the claimed invention and are not intended as a means for defining the limits and scope of the invention.

BRIEF DESCRIPTION OF THE DRAWING FIGURES

In the drawing, wherein similar reference numerals and symbols denote similar features throughout the several views.

DETAILED DESCRIPTION OF THE DRAWING FIGURES AND PREFERRED EMBODIMENTS

The present invention will be described, by way of example only, with reference to the accompanying drawings.

Figure 1:
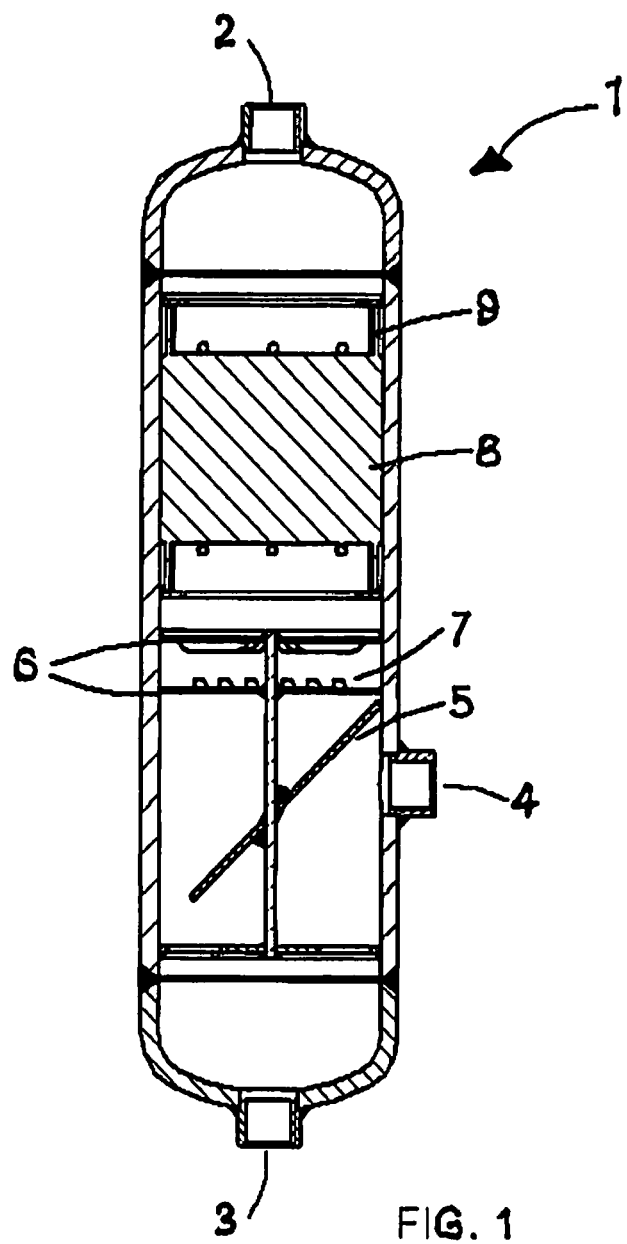
FIG. 1 is a longitudinal section of a device of the present invention.

Referring to FIG. 1 of the accompanying drawings, there is illustrated a vessel 1, having a gas outlet at one end 2, a moisture outlet 3 at the other end and a gas inlet 4 situated between said gas outlet and said moisture outlet. This vessel includes three stages of liquid removal. The first stage comprises an angled baffle 5 modifying the direction of gas flow and causing the entrained moisture in the gas flow to be siphoned off. The present invention comprises a second stage of liquid removal. It exists, in this embodiment of the present invention, in the form of two plates 6 extending across the vessel, similarly modifying the direction of gas flow by forcing the gas through a number of hooded perforations 7 contained within said plate. The third stage of liquid removal comprises a demister pad 8 made up of monofilament wire constructed in a mesh arrangement. Each segment of the demister pad is supported by support grids 9. This third stage liquid removal serves to trap moisture contained within the gas stream, with the result that only dry gas manages to reach the gas outlet 2.

Figure 2:
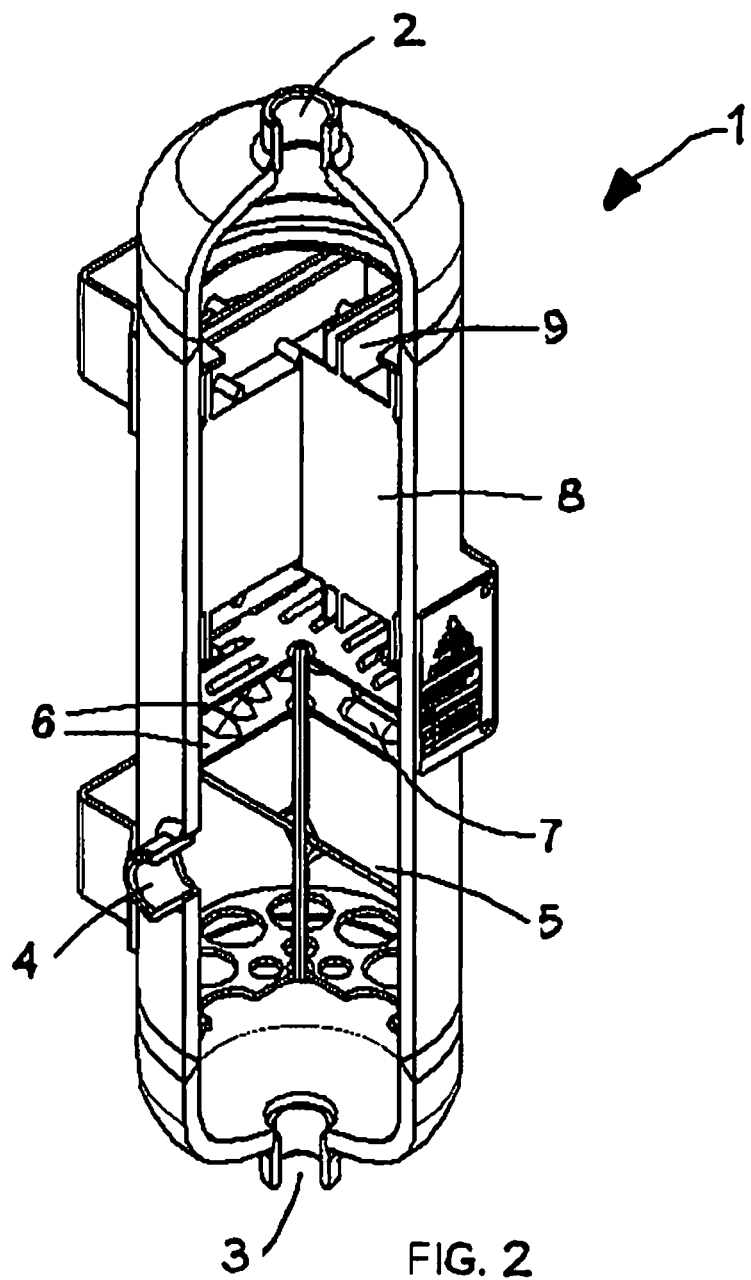
FIG. 2 is a perspective view of the device of FIG. 1, partly cut away to show the interior of the device; and, FIG. 3 in a perspective view of the flow modifying elements of the device of FIG. 1.

Referring to FIG. 2 of the accompanying drawings, there is illustrated an isometric cross section of the vessel as described with reference to FIG. 1.

Figure 3:
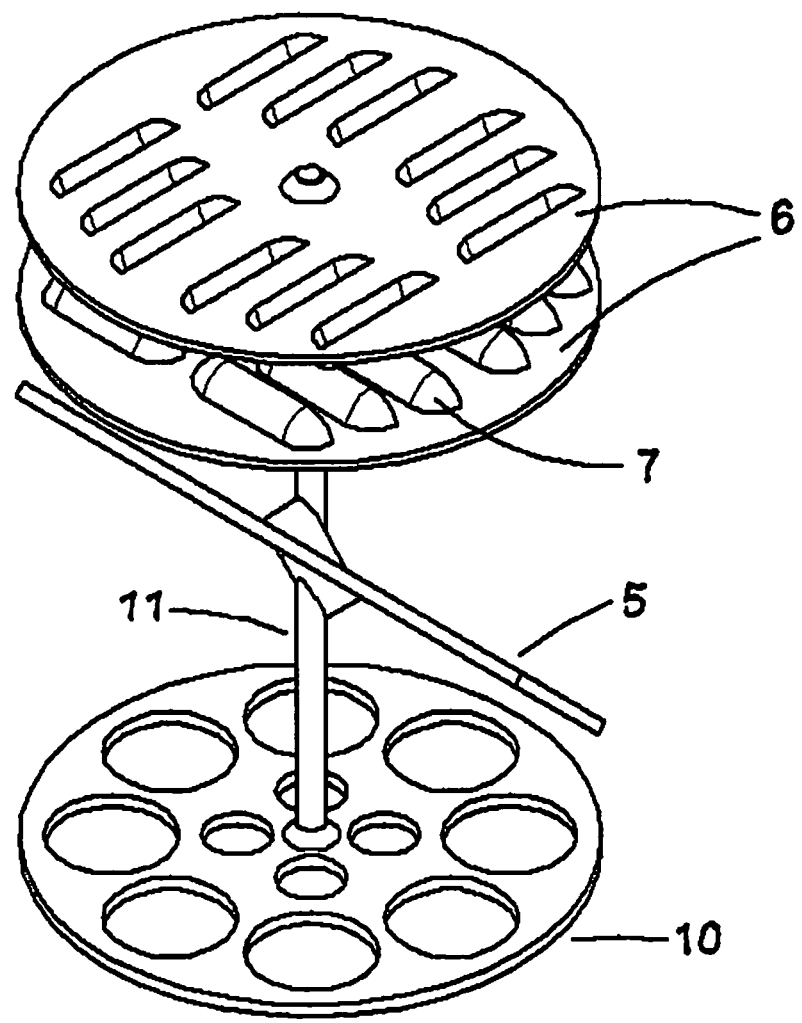

Referring to FIG. 3 of the accompanying drawings, there is illustrated an isometric embodiment of the present invention shown independent from the vessel described above with reference to FIGS. 1 and 2, but forming part of a connecting unit which supports stages 1 and 2 of liquid removal. The unit comprises a first panel 10 containing twelve circular orifices serving to direct moisture towards the moisture outlet. A central support shaft 11 extends vertically upwards from the panel 10 accommodating an angled baffle 5 and supporting the two plates 6, which comprise the present invention. The second plate is rotated 90 degrees from the position of the first plate, each plate serving as first and second gas flow modifying means. Each plate contains twelve elongate hooded slots 7 which are of equal dimension and arranged in the same orientation.

What is claimed is:

1. A device for removing moisture from a gas, comprises an elongated vessel having a gas outlet at a first end, a moisture outlet at a second end and a gas inlet located between said gas outlet and said moisture outlet, said elongated vessel includes first gas flow modifying means and second gas flow modifying means each for causing deviation of the flow of gas within the elongated vessel from a flow path extending directly between said gas inlet and said gas outlet, said first gas flow modifying means being formed as an angled baffle plate extending partly across the elongated vessel and arranged for directing the gas flow from the elongated vessel in a direction towards said moisture outlet, said second gas flow modifying means comprising a plurality of plates extending across the elongated vessel, each plate of said plurality of plates of said second gas flow modifying means having a plurality of elongated slots extending in a same orientation with said elongated slots of one plate of said plurality of plates extending in a direction rotated 90° from at least one other said plate of said second gas flow modifying means wherein each slot of said plurality of elongate slots has opposed elongate edges which are laterally displaced from each other, wherein each said slot of said plurality of elongate slots is formed by pressing a section of material out of a planar portion of said plates of said second gas flow modifying means for forming a hooded orifice, a demister pad for an additional stage of liquid removal, and wherein the demister pad comprises a mesh formed of monofilament wire.

2. A flow modifier for use in a device for removing moisture from a gas, said device for removing moisture from a gas comprises an elongated vessel having a gas outlet at a first end, a moisture outlet at a second end and a gas inlet located between said gas outlet and said moisture outlet, said flow modifier includes first gas flow modifying means and second gas flow modifying means each for causing deviation of the flow of gas within the elongated vessel from a flow path extending directly between said gas inlet and said gas outlet, said first gas flow modifying means being formed as an angled baffle plate extending, in use, partly across the elongated vessel for directing the gas flow from the elongated vessel in a direction towards said moisture outlet, said second gas flow modifying means comprising a plurality of plates extending across the elongated vessel, each plate of said plurality of plates of said second gas flow modifying means having a plurality of elongated slots extending in a same orientation with said elongated slots of one plate of said plurality of plates extending in a direction rotated 90° from at least one other said plane of said second gas flow modifying means wherein each slot of said plurality of elongate slots has opposed elongate edges which are laterally displaced from each other, wherein each said slot of said plurality of elongate slots is formed by pressing a section of material out of a planar portion of said plates of said second gas flow modifying means for forming a hooded orifice, a demister pad for an additional stage of liquid removal, wherein the demister pad comprises a mesh formed of monofilament wire.

* * * * *